United States Patent
Frizzell et al.

(10) Patent No.: US 11,855,427 B2
(45) Date of Patent: Dec. 26, 2023

(54) CLAMPING DEVICE FOR CABLE CONNECTOR ASSEMBLY

(71) Applicant: CMP PRODUCTS LIMITED, Newcastle upon Tyne (GB)

(72) Inventors: Lee Frizzell, Newcastle upon Tyne (GB); Martin Swan, Newcastle upon Tyne (GB)

(73) Assignee: CMP PRODUCTS LIMITED, Newcastle upon Tyne (GB)

( * ) Notice: Subject to any disclaimer, the term of this patent is extended or adjusted under 35 U.S.C. 154(b) by 0 days.

(21) Appl. No.: 17/794,246

(22) PCT Filed: Jan. 7, 2021

(86) PCT No.: PCT/EP2021/050200
§ 371 (c)(1),
(2) Date: Jul. 20, 2022

(87) PCT Pub. No.: WO2021/148254
PCT Pub. Date: Jul. 29, 2021

(65) Prior Publication Data
US 2023/0133454 A1  May 4, 2023

(30) Foreign Application Priority Data

Jan. 24, 2020  (EP) ................................. 20153677
Oct. 13, 2020  (GB) ................................. 2016199

(51) Int. Cl.
*H02G 3/00* (2006.01)
*H02G 3/06* (2006.01)
*H01R 9/05* (2006.01)

(52) U.S. Cl.
CPC ......... *H02G 3/0666* (2013.01); *H01R 9/0521* (2013.01)

(58) Field of Classification Search
CPC ........................... H02G 3/0666; H01R 9/0521
See application file for complete search history.

(56) References Cited

U.S. PATENT DOCUMENTS

| 5,965,847 | A | 10/1999 | Tanaka et al. | |
| 9,343,890 | B2* | 5/2016 | Pelletier | H02G 3/0658 |

(Continued)

FOREIGN PATENT DOCUMENTS

| DE | 2519053 | 11/1976 |
| GB | 928336 | 6/1963 |

OTHER PUBLICATIONS

DE 2519053 A1; English Translation (Year: 1976).*

(Continued)

*Primary Examiner* — Pete T Lee
(74) *Attorney, Agent, or Firm* — Wells St. John P.S.

(57) ABSTRACT

An insert for a clamping device for clamping an armour layer of a cable in a cable gland is disclosed. The insert comprises a body (54) adapted to be received in a cable gland and defining an aperture (60) for receiving an inner part of a cable. A clamping portion (62) is adapted to engage an armour layer of the cable to clamp the armour layer between the clamping portion and a clamping member of the clamping device when the clamping member is arranged outwardly of the clamping portion. At least part of the clamping portion is displaceable inwards as a result of engagement of the clamping portion with the armour layer clamped between the clamping portion and the clamping member.

6 Claims, 5 Drawing Sheets

(56) References Cited

U.S. PATENT DOCUMENTS

| | | | | |
|---|---|---|---|---|
| 2004/0074662 A1* | 4/2004 | Hand | .................... | H02G 15/04 |
| | | | | 174/667 |
| 2004/0266258 A1* | 12/2004 | Stirling | ................ | H01R 9/0521 |
| | | | | 439/578 |
| 2005/0164553 A1* | 7/2005 | Montena | .............. | H01R 9/0524 |
| | | | | 439/578 |
| 2017/0117692 A1* | 4/2017 | Swan | ................... | H02G 3/0666 |
| 2018/0323599 A1* | 11/2018 | Proud | ................... | B29C 70/682 |

OTHER PUBLICATIONS

GB 928336 (Year: 1963).*
WO PCT/EP2021/050200 Search Rpt., dated Mar. 19, 2021, CMP Products Limited.
WO PCT/EP2021/050200 Writ. Opin., dated Mar. 19, 2021, CMP Products Limited.

* cited by examiner

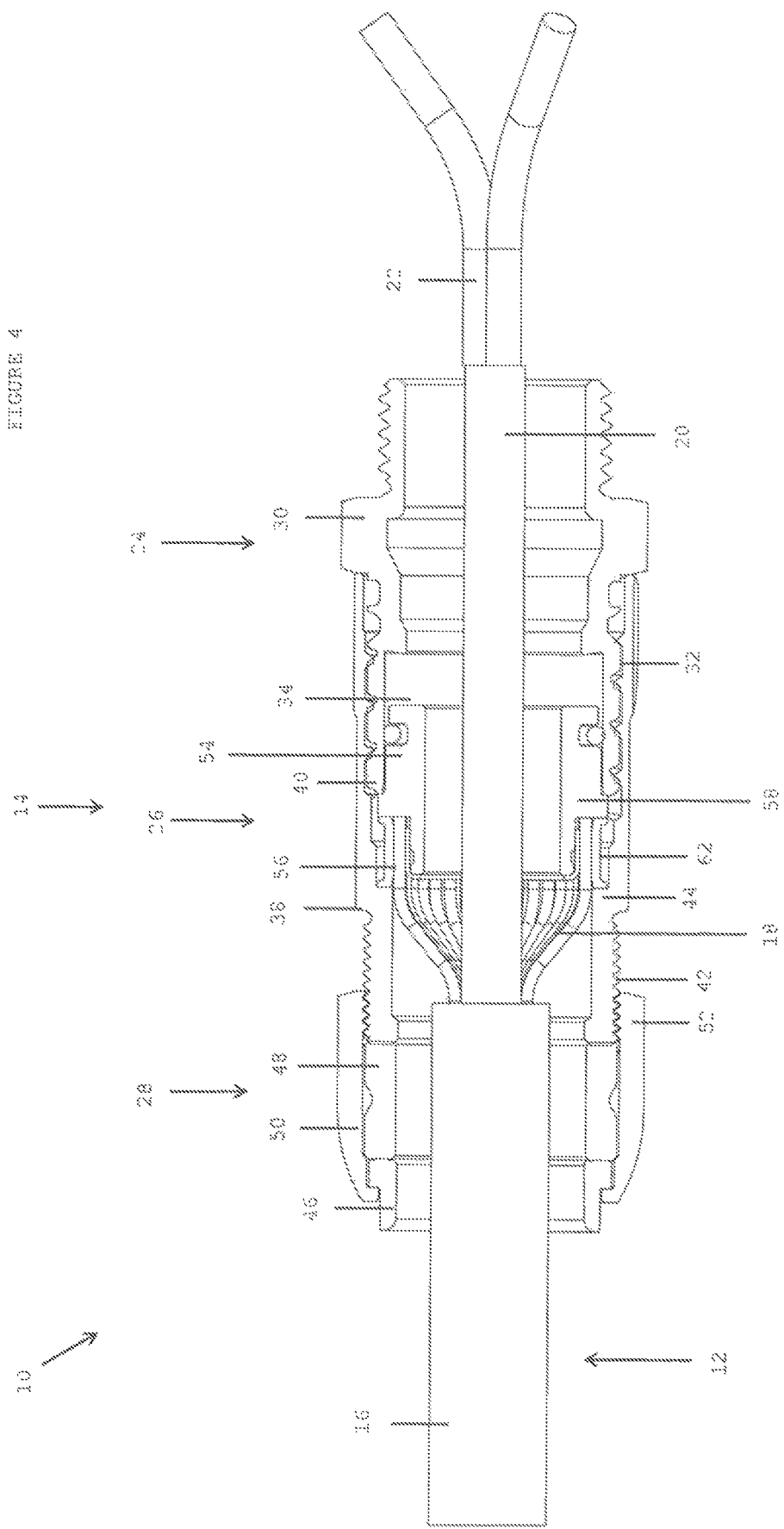

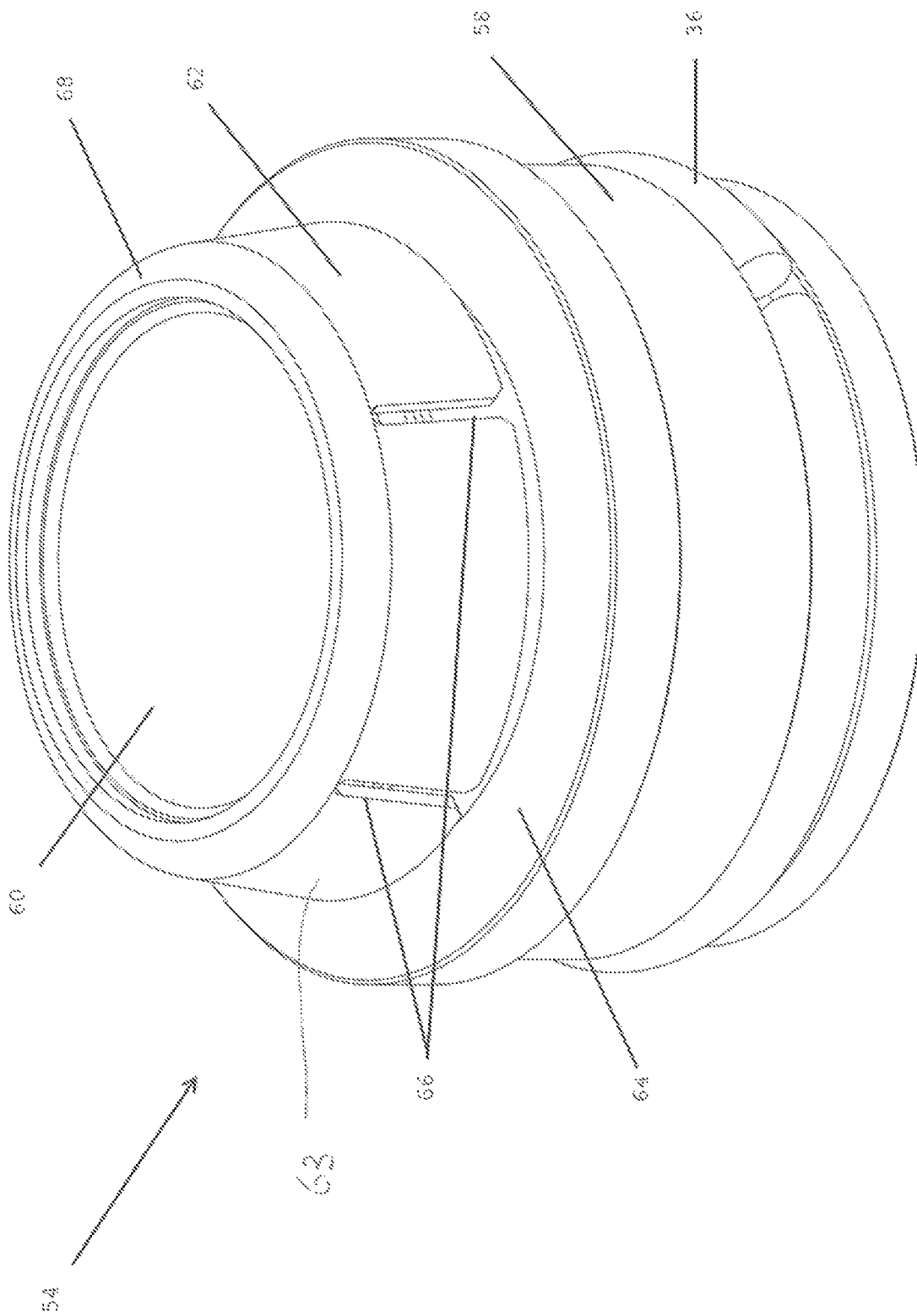

CLAMPING DEVICE FOR CABLE CONNECTOR ASSEMBLY

The present disclosure relates to a clamping device for a cable connector assembly for clamping an armour layer of a cable, and relates particularly, but not exclusively, to a clamping device for clamping single wire armour or braid of a cable within a cable gland.

Cable glands provide a mechanical connection between a cable and an installation, such as a junction box. The connection may have to satisfy one or more physical requirements, such as the ability to resist pulling forces experienced by the cable, to prevent the ingress of water from the surrounding environment, or the force of an explosion.

A cable may include an integrated layer of armour for providing mechanical strength to the cable and for preventing damage to the inner layers and wires of the cable. The armour layer may for example be single wire armour, metallic tape, braid or screen.

Armour layers are metallic and it is therefore often necessary for electrical safety to provide a secure connection between the armour layer and earth when the cable is installed in the cable gland. Therefore, in addition to providing a secure mechanical connection between the installation and the cable, the cable gland must maintain a reliable electrical connection between the armour layer of the cable and earth. This is usually achieved by means of a clamping device arranged in the cable gland housing. The clamping device has an inner part known as a cone and an outer part known as a clamping ring, and the cable armour layer is clamped between the cone and the clamping ring and held in the clamping position by the cable gland housing.

Different armour types have different physical characteristics. For example, single wire armour comprises wires which are thick and stiff, while braid comprises a large number of finer wires. In order to provide a sufficiently secure mechanical and electrical connection, the clamping device of the cable gland must be chosen so that it closely matches the physical dimensions of the armour layer of the cable being clamped.

Clamping devices for cable glands are known in which a pair of cones of different sizes is provided, wherein the cone of one size is used for braid, and the cone of the other size is used for single wire armour. Alternatively, a double cone can be provided, wherein one end of the cone is suitably sized for braid and the other end of the cone is suitable sized for single wire armour, and the double cone is reversibly arranged in a cable gland, the orientation of the double cone depending on the type of armour to be clamped. However, because two cones are usually provided when a cable gland assembly is supplied, there is a possibility of choosing the inappropriately sized cone for a particular cable armour type, which means that when installed, the mechanical or electrical connection has an increased risk of failure.

Clamping devices are also known in which a tapering gap is formed between the cone and the clamping ring. The cable armour layer is held in a clamped condition in the tapering gap, but the position of the cone and clamping ring relative to each other varies, depending on whether braid or single wire armour is being clamped. This in turn means that the position of the two mutually engaging cable gland housing parts also varies with the type of cable armour being clamped, as a result of which it is difficult to determine whether a reliable clamping connection has been made.

Preferred embodiments of the present disclosure seek to overcome one or more of the above disadvantages of the prior art.

According to a first aspect of the present disclosure, there is provided a clamping device for clamping an armour layer of a cable in a cable connector, the clamping device comprising: an insert adapted to be received in a cable connector, wherein the insert defines an aperture for receiving an inner part of a cable and defines at least one clamping surface adapted to engage an armour layer of the cable; and a clamping member adapted to be arranged outwardly of the insert in a direction transverse to an axial direction of the cable to clamp the armour layer between at least one said clamping surface and the clamping member, wherein at least part of at least one said clamping surface is displaceable towards the inner part of the cable when said inner part extends through said aperture as a result of engagement of the insert with the armour layer clamped between the clamping surface and the clamping member to enable a range of thicknesses of said armour layer to be clamped between the clamping surface and the clamping member when the insert and the clamping member are in a predetermined position relative to each other.

By providing a clamping member and an insert to clamp the armour layer between at least one said clamping surface and the clamping member, wherein at least part of at least one said clamping surface is displaceable towards the inner part of the cable when said inner part extends through said aperture as a result of engagement of the insert with the armour layer clamped between the clamping surface and the clamping member to enable a range of thicknesses of said armour layer to be clamped between the clamping surface and the clamping member when the insert and the clamping member are in a predetermined position relative to each other, this provides the advantage that cables having different types of armour layer may be securely clamped by means of a single type of cable connector assembly without requiring the correct selection of an interchangeable insert, thereby improving the reliability of the clamping connection. The advantage is also provided that the provision of a displaceable clamping surface avoids the need for the clamping action to be effected by a tapering gap of varying length between the cone and clamping ring, as a result of which the cable gland can be made more compact and the mutually engaging parts of the cable connector housing can be arranged to have the same position relative to each other in the clamping position, regardless of the type of cable armour being clamped. The advantage is also provided that the overall length of the clamping apparatus, in an axial direction of the cable, can be kept constant, which enables the relative position of two cable connector housing parts accommodating the clamping apparatus to also be kept constant. This in turn enables a necessary clamping torque to be more reliably applied to the clamping apparatus and to be more reliably identified by a user of the cable connector, thereby making reliable connection of the cable connector to the cable armour easier to determine. This further improves the reliability of operation of the cable connector assembly, since it is easier to determine that a reliable clamping connection has been made when the clamping device is located inside an assembled cable connector.

At least part of at least one said clamping surface may be displaceable towards the inner part of the cable by means of deformation of said part of the clamping surface.

This provides the advantage of reducing the complexity of the insert and reducing the manufacturing cost of the insert.

At least part of at least one said clamping surface may be defined by a plurality of inwardly displaceable portions separated by slots.

This provides the advantage of enabling the mechanical characteristics of the clamping surface to be tailored, and enables a wider variety of materials to be used for the clamping surface.

The slots may terminate at a location spaced from an end face of the clamping insert.

This provides the advantage of enabling the insert to be more easily manufactured, while increasing the mechanical strength of the insert.

The insert and the clamping member may be adapted to abut each other in an axial direction of the cable when said armour layer is clamped between the insert and the clamping member when the insert and the clamping member are in a predetermined position relative to each other.

This provides the advantage of enabling the length of the clamping apparatus, in an axial direction of the cable, to be constant for a range of cable armour thicknesses, thereby enabling reliable connection of a cable connector to the cable armour easier to determine.

The clamping member may be deformable.

This provides the advantage of further distributing the stress experienced by the clamping member to further reduce the likelihood of wear or failure of the clamping member.

According to a second aspect of the present disclosure, there is provided a cable connector assembly, comprising: a clamping device as defined above; a first housing part adapted to receive said insert; and a second housing part adapted to engage said first housing part to maintain said insert and said clamping member in position relative to each other to clamp an armour layer of a cable between at least one said clamping surface and said clamping member.

The first and second housing parts may be co-operatively threaded such that engagement of the first housing part by the second housing part causes one housing part to abut the insert and the other housing part to abut the clamping member to move the clamping member to surround the insert and to thereby engage the armour layer between the clamping member and at least one said clamping surface of the insert.

This provides the advantage of increasing the ease of installation of the armour within the assembly.

A position of the first housing part relative to the second housing part may be defined by abutment with said insert and said clamping member in an axial direction of the cable when said armour layer is clamped between the insert and the clamping member when the insert and clamping member are in a predetermined position relative to each other.

This provides the advantage of enabling more reliable connection of the cable connector assembly with the cable by causing abutment with the insert and clamping member of the clamping apparatus to occur when the clamping apparatus is in the correct clamping condition.

Said position of the first housing part relative to the second housing part may be defined by abutment of the first housing part with one of said insert and said clamping member, and abutment of the second housing part with the other of said insert and said clamping member.

The cable connector assembly may be a cable gland assembly.

A preferred embodiment of the present disclosure will now be described, by way of example only and not in any limitative sense, with reference to the accompanying drawings, in which:

FIG. 4 is a cross sectional view of the cable gland of FIG. 3 in the second condition clamping the cable armour layer of a second type; and FIG. 5 is a perspective view of an insert of a clamping device used in the cable gland of FIGS. 1 to 4.

Figure 1:
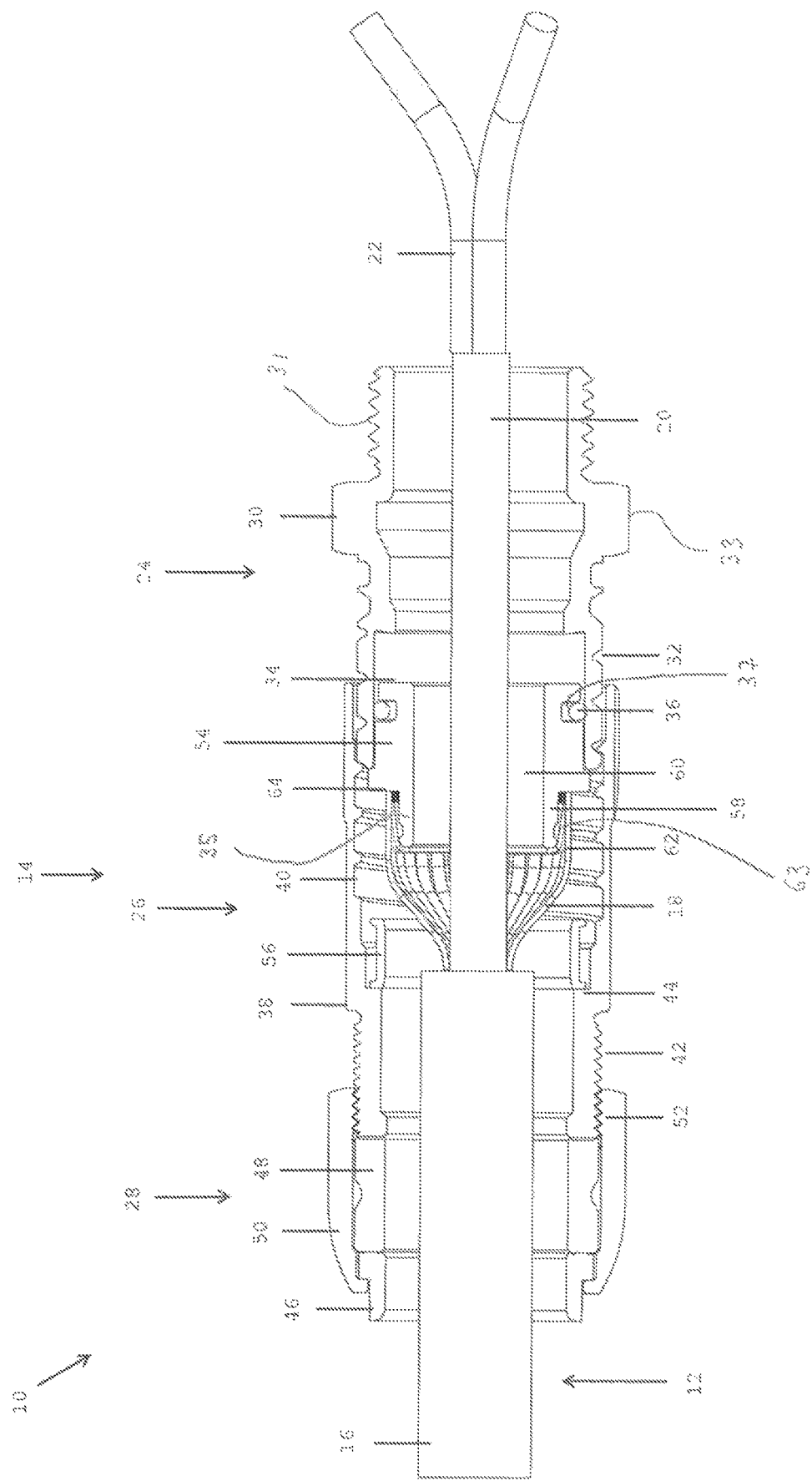
FIG. 1 is a cross sectional view of a cable gland embodying the present disclosure in a first condition before clamping of a cable armour layer of a first type.

REFERENCE NUMERALS 10 cable gland assembly
12 cable
14 clamping device
16 outer sheath
18 armour layer
20 inner sheath
22 core
24 first housing part
26 second housing part
28 third housing part
30 entry item
31 second thread
32 first thread
33 outer part
34 first abutment
35 insert
36 clip
37 groove
38 housing body
40 first thread
42 second thread
44 second abutment
46 ferrule
48 outer seal
50 outer nut
52 first thread
54 insert body
56 annular sleeve
58 annular end portion
60 aperture
62 compensator
63 compensator parts
64 third abutment
66 elongate slots
68 end face Referring to FIGS. 1 to 4, a cable gland assembly 10 is shown for connection to a cable 12. The assembly 10 includes a clamping device 14. The cable 12 is shown arranged within the clamping device 14 so that the clamping device 14 makes a clamping connection to an armour layer 18 of the cable 12. The cable 12 also has an outer sheath 16, an inner sheath 20, and cores 22.

The cable gland assembly 10 also comprises a first housing part 24, a second housing part 26, and a third housing part 28. The first housing part 24 comprises an entry item 30 having a first thread 32 on its outer surface, a first abutment 34, a second thread 31 for engaging a thread on an enclosure (not shown) or a nut (not shown) for securing the cable gland to the enclosure, and an outer part 33 for engagement by a tool such as a wrench to enable rotation of the first body part 24.

The second housing part 26 comprises a housing body 38 having a first thread 40 on its inner surface for co-operating with the first thread 32 of the first housing part 24, a second thread 42 on its outer surface, and a second abutment 44. The third housing part 28 comprises a ferrule 46, an outer compression seal 48, and an outer nut 50 having a first thread 52 on its inner surface for co-operating with the second thread 42 of the second housing part 26.

The clamping device 14 comprises an insert 35, the insert 35 having an insert body 54, and a clamping portion in the form of an annular sleeve 56. The annular sleeve 56 is shown having a C-shaped cross-section. The insert body 54 is releasably held in the first body part 24 by means of a compressible, discontinuous metallic clip 36 located in a groove 37 in the insert body 54.

Referring also to FIG. 5, the insert body 54 has an annular end portion 58 defining an aperture 60 through the insert body 54 for passage therethrough of the inner sheath 20 and cores 22 of the cable 12, and a clamping member in the form of a compensator 62. The insert body 54 further comprises a third abutment 64 on its outer surface.

The compensator 62 is annular in shape and is mounted or fixed to the insert body 54. The compensator 62 is adapted to be displaceable inwardly, that is toward the insert body 54. In one embodiment, the compensator 62 has greater flexibility than the annular sleeve 56. The compensator 62 is shown comprising a plurality of slots 66 which enable the parts 63 of the compensator 62 between the slots 66 to displace independently of one another and provide additional flexibility to the compensator 62. The compensator 62 is shown having an end face 68, and the slots 66 are shown terminating at locations spaced from the end face 68.

Figure 2:
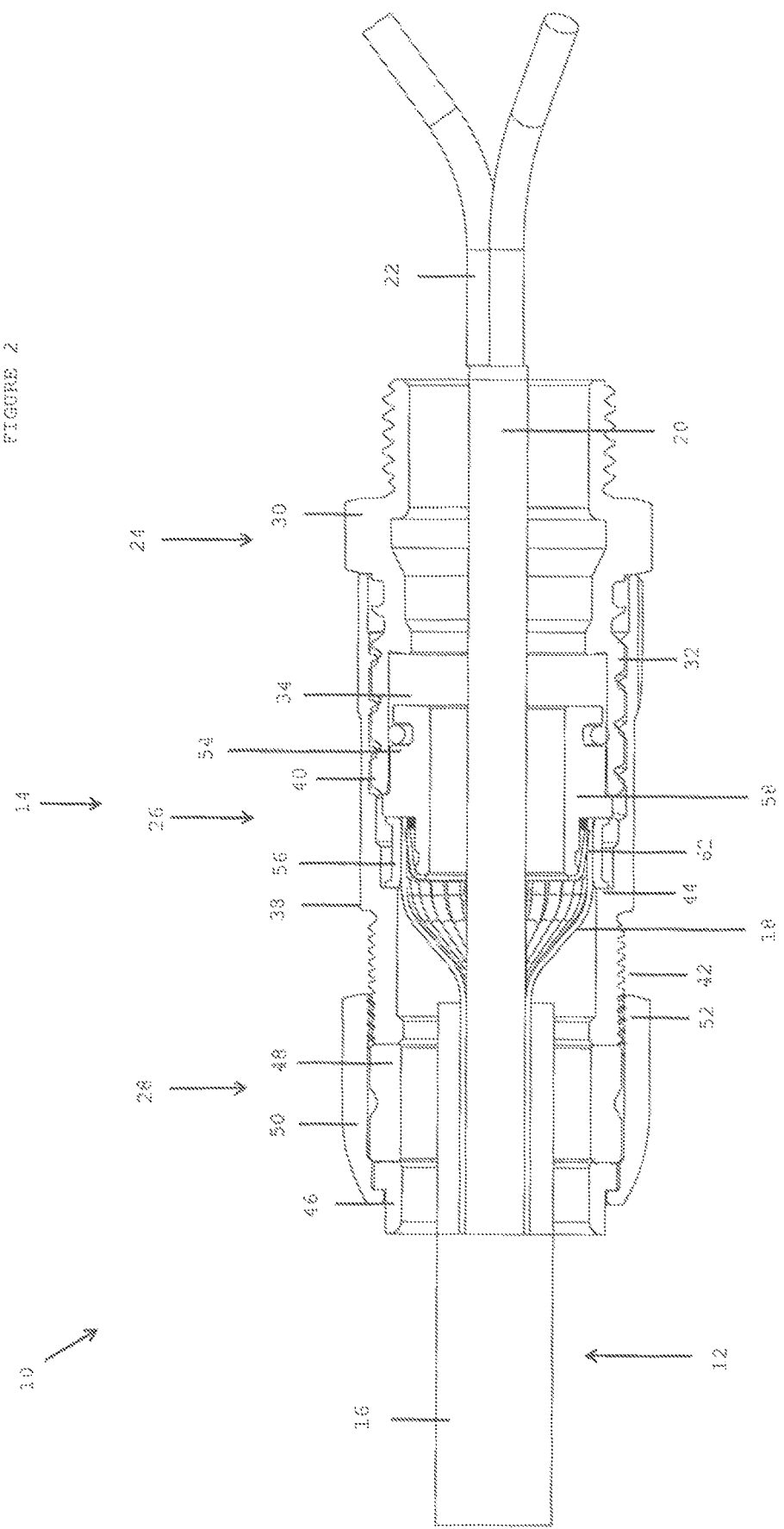
FIG. 2 is a cross section view of the cable gland of FIG. 1 in a second condition clamping the cable armour layer of a first type.
Figure 3:
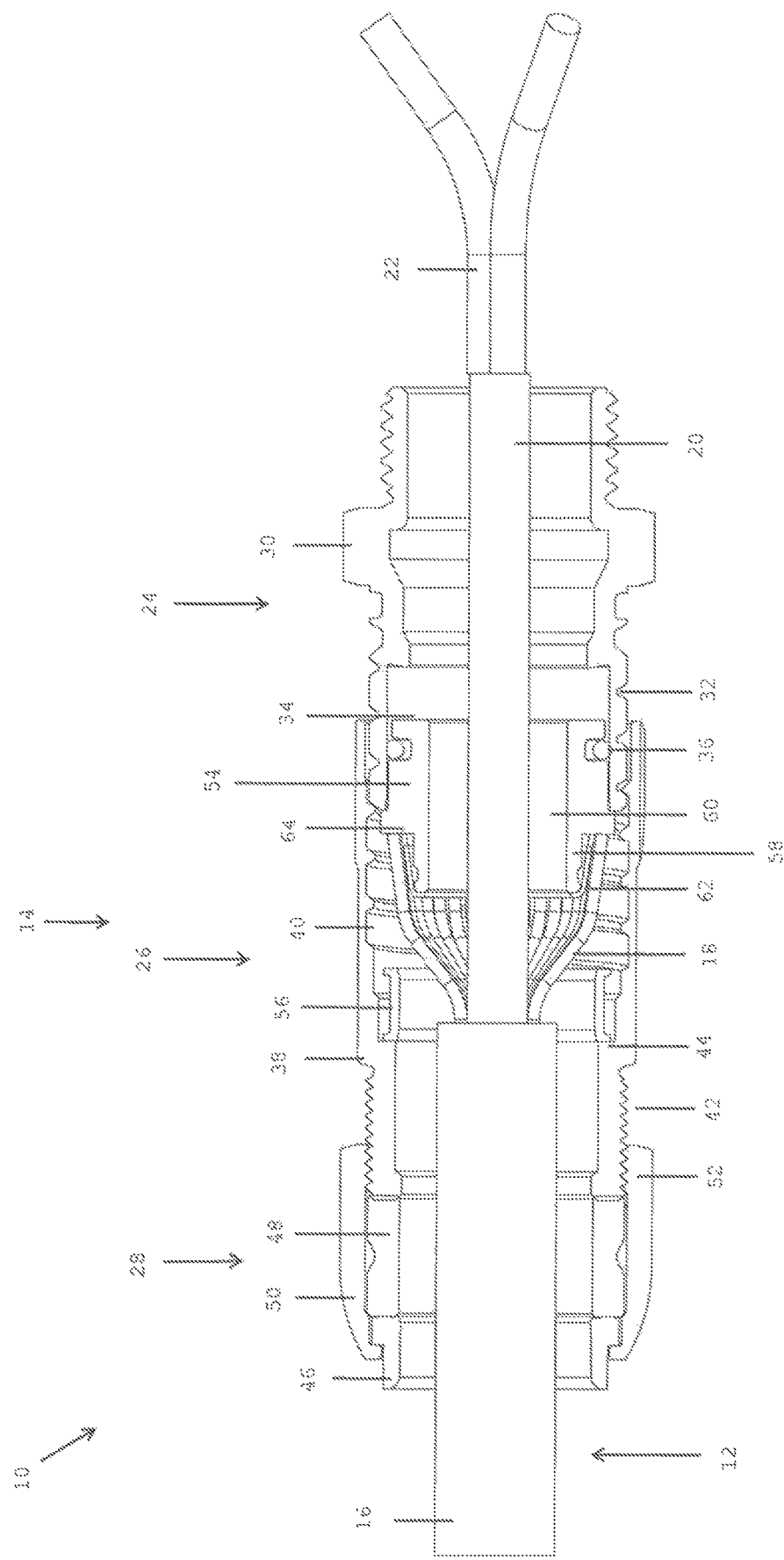
FIG. 3 is a cross sectional view of the cable gland of FIG. 1 in the first condition before clamping of a cable armour layer of a second type.

Referring to FIGS. 1 and 3, the compensator 62 is seen in an uncompressed condition prior to clamping of the armour 18. In FIGS. 2 and 4, the compensator 62 is shown in a clamping condition wherein the annular sleeve 56 is arranged around the insert body 54 to engage the armour layer 18 between an inner surface of the annular sleeve 56 and the flexed compensator 62, thereby gripping the armour layer 18.

Referring to FIG. 2, the compensator 62 is shown engaging an armour layer 18 in the form of braid. In FIG. 4, the compensator 62 is shown engaging an armour layer 18 in the form of single wire armour, which is comparatively thicker and stiffer. The insert body 54 shown in FIGS. 1 to 4 is the same insert and is capable of engaging both types of armour 18 to provide a reliable mechanical and electrical connection without requiring modification of the clamping device 14 and without requiring a particular choice of a cable gland insert from a variety of such inserts.

The installation of the cable 12 in the clamping device 14 will now be described.

Referring to FIGS. 1 and 3, the cable 12 to be installed in the clamping device 14 is located through the clamping device 14. The cable 12 enters the third housing part 28 and the outer sheath 16 terminates within the third housing part 28. The protruding armour layer 18 is arranged adjacent and radially outward of the compensator 62 and is located to meet the third abutment 64 of the insert body 54. The inner sheath 20 and cores 22 pass through the aperture 60 of the insert body 54 and onward through the first housing part 24 and out of the clamping device 14.

Referring to FIGS. 2 and 4, once the cable 12 is located at the correct position relative to the insert 35, the first housing part 24 and second housing part 26 are threaded together by means of first thread 32 on the first housing part 24 and the first thread 40 on the second housing part 26 to move the first and second housing parts 24, 26 closer to one another. The first abutment 34 of the first housing part 24 abuts the insert body 54 while the second abutment 44 of the second housing part 26 abuts the annular sleeve 56. As the first housing part 24 and second housing part 26 are moved toward one another by action of the threading, the annular sleeve 56 and insert body 54 are moved toward one another such that the annular sleeve 56 moves over the armour layer 18 and pushes the armour layer 18 radially inwardly towards the outer surface of the compensator 62. As the armour layer 18 meets the compensator 62, the compensator 62 displaces or flexes radially inwardly toward the inner portion 56 to accommodate the shape of the armour layer 18 and the armour layer 18 is gripped between the inner surface of the annular sleeve 56 and the outer surface of the compensator 62. The threading action is continued until the annular sleeve 56 abuts the insert body 54.

Since the axial length of the assembled clamping device 14 is the same for a range of thicknesses of armour layer 18, when the annular sleeve 56 abuts the second housing part 26, and the insert body 54 abuts the first abutment 34 of the first housing part 24, it can be determined that the assembled clamping device 14 has reached its minimum axial length, and that the armour layer 18 of the cable 12 has therefore been securely clamped between the insert 54 and the annular sleeve 56.

When clamping of the cable armour layer 18 is complete, the third housing part 28 is mounted to the second housing part 26 to axially compress the seal 48, which causes radial expansion of the seal 48 to bring the seal 48 into sealing engagement with the outer sheath 16 of the cable 12.

It will be appreciated by persons skilled in the art that the above embodiment has been described by way of example only and not in any limitative sense, and that various alterations and modifications are possible without departure from the scope of the disclosure as defined by the appended claims.

The invention claimed is:

1. A cable connector assembly, comprising:
 a clamping device for clamping an armour layer of a cable in a cable connector, the clamping device comprising:
   an insert adapted to be received in a cable connector, wherein the insert defines an aperture for receiving an inner part of a cable and defines at least one clamping surface adapted to engage an armour layer of the cable; and
   a clamping member adapted to be arranged outwardly of the insert in a direction transverse to an axial direction of the cable to clamp the armour layer between at least one said clamping surface and the clamping member, wherein at least part of at least one said clamping surface is displaceable towards the inner part of the cable when said inner part extends through said aperture as a result of engagement of the insert with the armour layer clamped between the clamping surface and the clamping member to enable a range of thicknesses of said armour layer to be clamped between the clamping surface and the clamping member when the insert and the clamping member are in a predetermined position relative to each other;
 a first housing part adapted to receive said insert;
 a second housing part adapted to engage said first housing part to maintain said insert and said clamping member in position relative to each other to clamp the armour layer of the cable between at least one said clamping surface and said clamping member;

wherein the first and second housing parts are co-operatively threaded such that engagement of the first housing part by the second housing part causes one housing part to abut the insert and the other housing part to abut the clamping member to move the clamping member to surround the insert and to thereby engage the armour layer between the clamping member and at least one said clamping surface of the insert; and wherein a position of the first housing part relative to the second housing part is defined by abutment with said insert and said clamping member and abutment of the first housing part with one of said insert and said clamping member, and abutment of the second housing part with the other of said insert and said clamping member, and by abutment of said insert with said clamping member in an axial direction of the cable when said armour layer is clamped between the insert and the clamping member.

2. The assembly according to claim 1, wherein at least part of at least one said clamping surface is defined by a plurality of inwardly displaceable portions separated by slots.

3. The assembly according to claim 2, wherein the slots terminate at a location spaced from an end face of the insert.

4. The assembly according to claim 1, wherein at least part of at least one said clamping surface is displaceable towards the inner part of the cable by means of deformation of said part of the clamping surface.

5. The assembly according to claim 1, wherein the clamping member is deformable.

6. A cable connector assembly according to claim 1, wherein the assembly is a cable gland assembly.

* * * * *